United States Patent [19]

Yajima et al.

[11] 4,117,057
[45] Sep. 26, 1978

[54] SILICON CARBIDE SINTERED MOLDINGS AND A METHOD FOR PRODUCING THE SAME

[75] Inventors: Seishi Yajima; Josaburo Hayashi; Mamoru Omori, all of Oharai, Japan

[73] Assignee: The Research Institute for Iron, Steel and Other Metals of the Tohoku University, Sendai, Japan

[21] Appl. No.: 698,453

[22] Filed: Jun. 21, 1976

[30] Foreign Application Priority Data

Jun. 25, 1975 [JP] Japan .................................. 50/77567
Sep. 27, 1975 [JP] Japan ................................ 50/115965

[51] Int. Cl.² ........................................... C04B 35/26
[52] U.S. Cl. ..................................... 264/63; 106/44; 264/65; 264/85; 264/332; 423/345
[58] Field of Search ................... 264/332, 63, 65, 101, 264/85; 106/44; 423/345

[56] References Cited

U.S. PATENT DOCUMENTS

| | | | |
|---|---|---|---|
| 3,493,402 | 2/1970 | Niebylski | 106/44 |
| 3,520,656 | 7/1970 | Meadows et al. | 106/44 |
| 3,853,567 | 12/1974 | Verbeek | 106/44 |

FOREIGN PATENT DOCUMENTS 2,236,078  3/1974  Fed. Rep. of Germany ............. 106/44

Primary Examiner—Robert F. White
Assistant Examiner—John A. Parrish
Attorney, Agent, or Firm—Ladas, Parry, Von Gehr, Goldsmith & Deschamps

[57] ABSTRACT

Silicon carbide sintered moldings having a high flexural strength and various excellent properties are produced by mixing SiC powders or SiC fibers with a binder or organosilicon low molecular weight compounds or organosilicon high molecular weight compounds, molding the mixture into a desired shape and heating the molded mixture at a high temperature.

15 Claims, 9 Drawing Figures

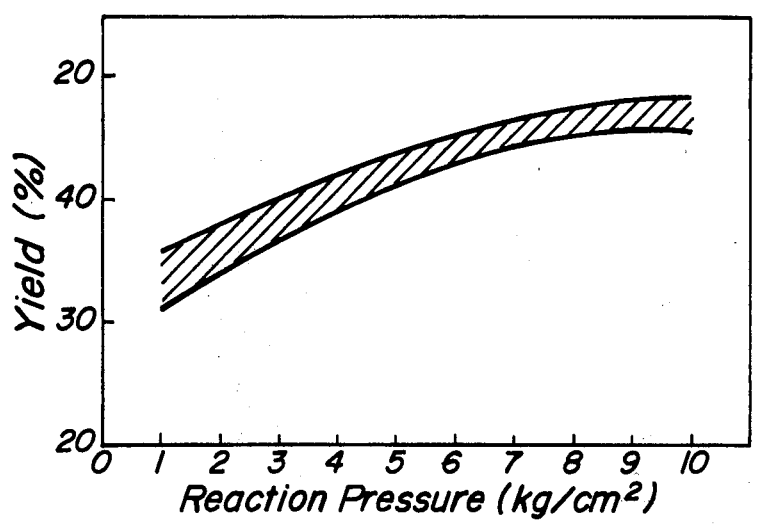
FIG_5
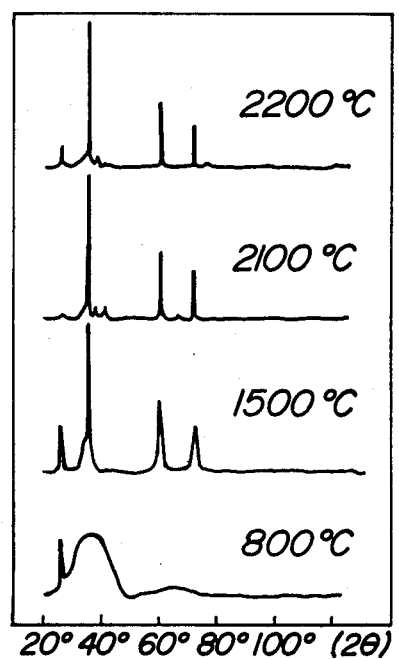
FIG_6

SILICON CARBIDE SINTERED MOLDINGS AND A METHOD FOR PRODUCING THE SAME

The present invention relates to silicon carbide sintered moldings and a method for producing the same, particularly a method for producing silicon carbide sintered moldings by molding a mixture of silicon carbide powders with an organosilicon compound, which is used as a binder, and heating the molded mixture.

As methods for producing silicon carbide sintered moldings, the following methods have been heretofore proposed.

(1) SiC powders are mixed with a clay and the resulting mixture is molded and then sintered.

(2) SiC powders are mixed with alumina, boron, silicon and the like and the resulting mixture is molded and then sintered.

(3) SiC powders are mixed with an organic resin, such as phenol furfural resin and the resulting mixture is molded and then sintered.

(4) SiC powders are mixed with silicon nitride, tungsten carbide and the like and the resulting mixture is molded and then sintered.

SiC is poor in self-sintering ability and the sintered molding obtained from SiC alone has a porosity of 20-25% and a far lower density than the theoretical density of SiC of 3.21 g/cm$^3$ and is excessively oxidized at a temperature of 900°-1,400° C. and it's mechanical strength is low.

However, the use of various binders as in the above described processes (1)-(4) has provided SiC sintered moldings having a high density and a high oxidation resistance. Particularly, highly dense SiC sintered moldings have been recently obtained through hot press by using SiC powders and several percent of a binder, such as alumina, boron, metallic silicon, tungsten carbide and the like. It has been known that such dense SiC sintered moldings are high in the crushing strength and excellent in the thermal shock resistance and oxidation resistance.

However, in the above described processes, the production step of SiC sintered moldings having a high strength is very complicated and the cost is too high to use such SiC sintered moldings and it is impossible to produce the sintered moldings having complicated shape. For example, it cannot be avoided that impurities other than SiC remain in the formed sintered moldings. For example, in the above processes (1) and (2), oxides, such as alumina, silicon, boron and the like are admixed, in the above process (3), free carbon remains and in the above process (4), silicon nitride, tungsten carbide and the like remain. Accordingly, there is problem in using the sintered moldings obtained through these methods for nozzle or crucible in the case of production of a highly pure Si single crystal. Furthermore, there is problem in using the sintered moldings as pipe, crucible, boat and the like for production of highly pure metals.

An object of the present invention is to provide a method for producing SiC sintered moldings wherein the above described defects of SiC sintered moldings are obviated.

Another object of the present invention is to provide SiC sintered moldings having a high purity, an improved oxidation resistance and a high strength.

The present invention is characterized by that as a binder for production of SiC sintered moldings, use is made of at least one of the following organosilicon compounds, (1) compounds having only Si—C bond,
(2) compounds having Si—H bond in addition to Si—C bond,
(3) compounds having Si—Hal bond, and
(4) compounds having Si—Si bond, and organosilicon high molecular weight compounds, in which silicon and carbon are main skeleton components, which are obtained through polycondensation reaction of the above described organosilicon compounds or the organosilicon compounds as explained hereinafter by addition of a catalyst for the polycondensation, irradiation or heating.

It has been found that when SiC powders are mixed with the above described organosilicon compounds or the above described organosilicon high molecular weight compounds as a binder and the resulting mixture is molded and then heated to sinter the mixture, the organosilicon compounds or organosilicon high molecular weight compounds are thermally decomposed and volatile components are volatilized and the remaining carbon and silicon react to form SiC, whereby the above described mixture is integrally sintered and the present invention has been accomplished.

SiC powders to be used in the present invention can be produced by heating electrically a mixture of silica and carbon in a silicating furnace at a high temperature. However, when SiC powders having possibly high purity are necessary, it is advantageous to use highly pure silica, for example more than 99.8% of SiO$_2$ and carbon having less than 0.3% of ash, for example, petroleum coke, retort carbon and the like.

SiC powders obtained by firing carbon having a high purity, such as sugar carbon or carbon black and metallic silicon having a high purity at a temperature higher than 1,250° C. can be advantageously used. Furthermore, SiC powders obtained by vapor phase cracking can be used.

However, when the use of SiC sintered moldings is not necessary so high purity, the commercially available SiC powders can be used.

As mentioned above, the above described four organosilicon compounds and the organosilicon high molecular weight compounds having a molecular weight of 100-600,000 can be used as the binder. When the organosilicon high molecular weight compounds or the above described four organosilicon compounds are mixed with SiC powders and the mixture is molded and then heated, these organosilicon compounds are thermally decomposed and hydrogen, chlorine or a part of carbon is volatilized and the remaining carbon and silicon react at a temperature of about 1,250° C. to form SiC, so that when the sintered moldings are formed, the purity of SiC is not deteriorated. Organosilicon compounds containing oxygen or nitrogen other than the above described compounds (1)-(4) can produce the sintered moldings, but in this case, a small amount of oxide or nitride of silicon may be formed.

The above described organosilicon compounds (1)-(4) capable of being used as the binder are exemplified as follows.

(1) Compounds having only Si—C bond:

Silahydrocarbons, such as R$_4$Si, R$_3$Si(R′SiR$_2$)$_n$R′SiR$_3$, carbon-functional derivatives thereof belong to this group. For example,

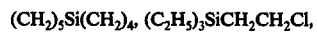

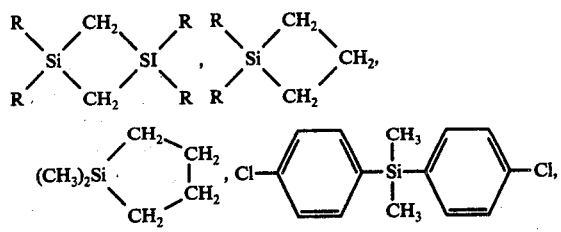

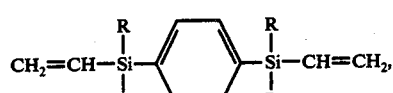

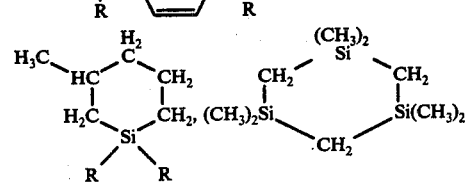

(2) Compounds having Si—H bond in addition to Si—C bond:

Mono-, di-, and triorganosilanes belong to this group. For example, $(C_2H_5)_2SiH_2$, $(CH_2)_5SiH_2$, $(CH_3)_3SiCH_2Si(CH_3)_2H$, $ClCH_2SiH_3$,

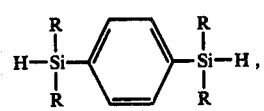

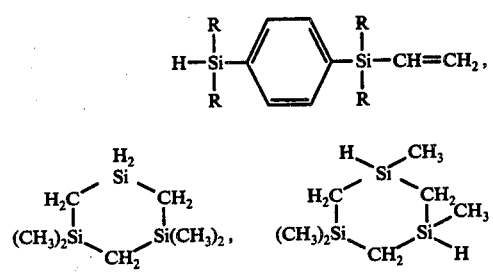

(3) Compounds having Si-Hal bond:
Organohalogensilanes.
For example, $CH_2=CHSiF_3$, $C_2H_5SiHCl_2$, $(CH_3)_2(ClCH_2)SiSi(CH_3)_2Cl$, $(C_6H_5)_3SiBr$,

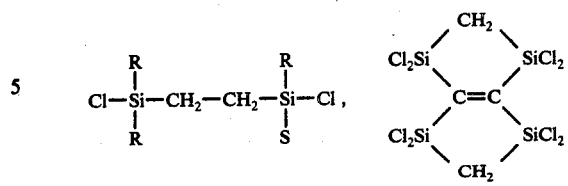

(4) Compounds having Si—Si bond:
For example, $(CH_3)_3SiSi(CH_3)_2Cl$, $(CH_3)_3SiSi(CH_3)_3$, $(C_6H_5)_3SiSi(C_6H_5)_2Si(C_6H_5)_2Cl$,

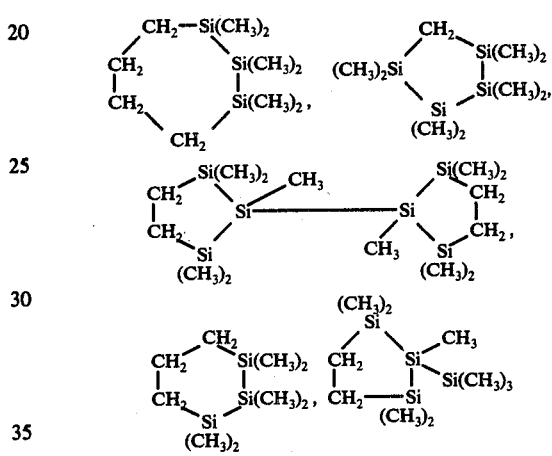

In the above formulae, R shows alkyl or aryl groups.

The organosilicon compounds for producing the organosilicon high molecular weight compounds to be used as the binder through the polycondensation reaction are classified into the following groups (5)–(10) in addition to the above described organosilicon compounds (1)–(4).

(5) Compounds having Si—N bond:
Silylamines belong to this group.
For example,

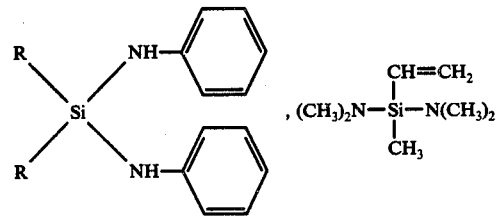

(6) Si—OR organoalkoxy (or aroxy) silanes:
For example, $(CH_3)_2Si(OC_2H_5)_2$, $C_2H_5SiCl_2(OC_2H_5)$,
p-$ClC_6H_4OSi(CH_3)_3$,

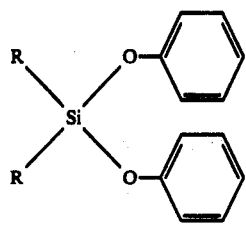

(7) Compounds having Si—OH bond:
Organosilanols.

For example, $(C_2H_5)_3SiOH$, $(CH_3)_2Si(OH)_2$, $C_6H_5Si(OH)_3$,
$(HO)(CH_3)_2SiCH_2Si(CH_3)_2(OH)$,

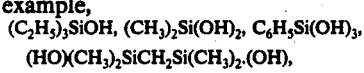

(8) Compounds having Si—O—Si bond:
Organosiloxanes.

For example, $(CH_3)_3SiOSi(CH_3)_3$, $HO(CH_3)_2SiOSi(CH_3)_2OH$,
$Cl_2(CH_3)SiOSi(CH_3)ClOSi(CH_3)Cl_2$,
$[(C_6H_5)_2SiO]_4$,
$CH_2\!=\!C(CH_3)CO_2CH_2Si(CH_3)_2C\text{-}$
$H_2O_2C(CH_3)\!=\!CH_2$

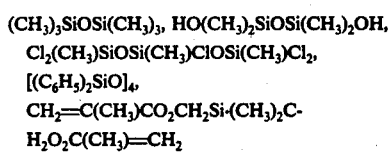

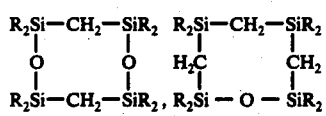

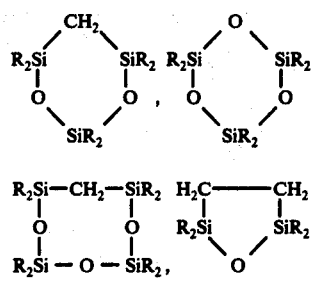

(9) Esters of organosilicon compounds:
Esters formed from silanols and acids.

$(CH_3)_2Si(OCOCH_3)_2$

(10) Peroxides of organosilicon compounds:

$(CH_3)_3SiOOC.(CH_3)_3$, $(CH_3)_3SiOOSi(CH_3)_3$

In the above formulae, R shows alkyl or aryl groups.

From these starting materials are produced organosilicon high molecular weight compounds, in which silicon and carbon are the main skeleton components. For example, compounds having the following molecular structures are produced.

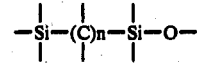

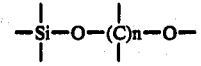

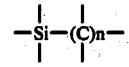

(d) The compounds having the above described skeleton components (a)–(c) as at least one partial structure in linear, ring and three dimensional structures or mixtures of the compounds having the above described skeleton components (a)–(c).

The compounds having the above described molecular structures are, for example as follows.

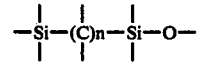

$n=1$, poly(silmethylenesiloxane),
$n=2$, poly(silethylenesiloxane),
$n=6$, poly(silphenylenesiloxane)

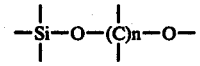

$n=1$, poly(methyleneoxysiloxane),
$n=2$, poly(ethyleneoxysiloxane),
$n=6$, poly(phenyleneoxysiloxane),
$n=12$, poly(diphenyleneoxysiloxane)

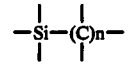

$n=1$, polysilmethylene,
$n=2$, polysilethylene,
$n=3$, polysiltrimethylene,
$n=6$, polysilphenylene,
$n=12$, polysildiphenylene (d) The compounds having the above described skeleton components as at least one partial structure in linear, ring and three dimensional structures or mixtures of the compounds having the above described skeleton components (a)–(c).

In the organosilicon high molecular weight compounds, in which silicon and carbon are the main skeleton components, even if silicon or carbon is present in the side chain, these elements are easily decomposed and volatilized, while silicon and carbon constituting the skeleton components are not easily decomposed and volatilized by heating and silicon and carbon bond at a high temperature to form SiC.

The production of the organosilicon high molecular weight compounds in which silicon and carbon are the main skeleton components from the starting materials of the organosilicon compounds belonging to the above described groups (1)–(10) can be effected by polycondensation attained by subjecting the organosilicon compounds belonging to the above described groups (1)-(10) to at least one of irradiation, heating and addition of a catalyst for the polycondensation.

For example, some well known reaction formulae for obtaining the above described organosilicon high molecular weight compounds from the above described starting materials belonging to the groups (1)-(10) through at least one of addition of the catalyst, irradiation and heating, are exemplified as follows.

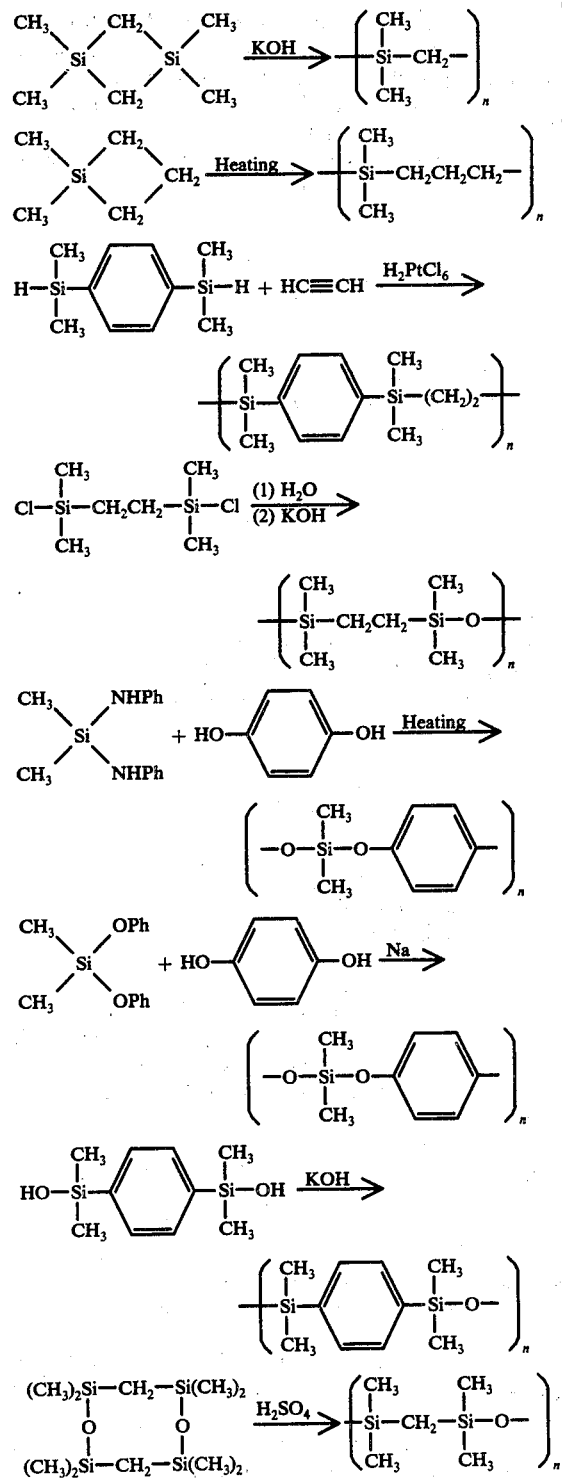

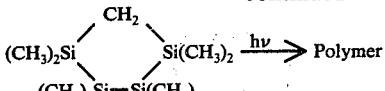

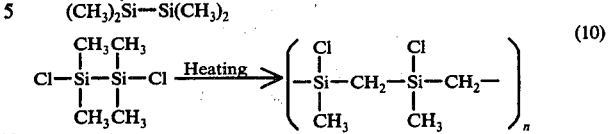

Other than the above described processes for producing the organosilicon high molecular weight compounds, at least one organosilicon compound selected from the above described groups (1)-(10) is polymerized within a temperature range of 200°-1,500° C. under vacuum, an inert gas, CO gas or hydrogen gas, if necessary, under pressure to produce the organosilicon high molecular weight compounds in which silicon and carbon are the main skeleton components.

The reason why the above described reaction should be effected within the temperature range of 200°-1,500° C. is as follows. When the temperature is lower than 200° C., the synthesis reaction does not satisfactorily proceed, while when the temperature is higher than 1,500° C., the decomposition reaction is violent and the yield of the organosilicon high molecular weight compound becomes small, so that the temperature range must be 200° to 1,500° C. and best results can be obtained within the temperature range of 300°-1,200° C.

The above described synthesizing reaction can be carried out in a pressure vessel and in this case, the optimum temperature range is 350°-500° C. and upon the thermal decomposition polycondensation reaction of the organosilicon compound, a pressure is applied, so that it is not always necessary to apply a pressure. The above described polycondensation reaction may be effected by using a continuous apparatus. An explanation will be made with respect to one embodiment of the continuous production apparatus, which is shown in FIG. 1. The organosilicon compound is charged into a heating reaction column 2 through a valve 1 and in the reaction column, the organosilicon compound is heated at a temperature of 300°-1,500° C., preferably 500°-1,200° C. and a part of the reaction product of organosilicon high molecular weight compound is discharged from the reaction system through a valve 3 and low molecular weight compounds formed in the heating reaction column 2 are fed into a fractionating column 5 through a valve 4 and distillation and separation are effected therein and the formed gas is discharged from the fractionating column 5 through a valve 6 and the high molecular weight compound is taken out from the fractionating column 5 through a valve 7. The low molecular weight compounds separated in the fractionating column are recycled into the heating reaction column 2 through a valve 8.

The molecular structure of the thus obtained organosilicon high molecular weight compounds was tested by nuclear magnetic resonance absorption spectrum and infrared spectrum and the presence of (Si—C)bond was recognized and it has been found that in the above described organosilicon high molecular weight compounds, the main skeleton components are constituted with silicon and carbon.

An explanation of process for using the binder will be made with respect to polycarbosilane which is easily produced among the binders and is the smallest in decrease of weight after heat treatment and therefore can be advantageously used.

Polycarbosilane is liquid or solid and can be used directly or in a viscous solution dissolved in a solvent, such as benzene, toluene, xylene, hexane, ether, tetrahydrofuran, dioxane, chloroform, methylene chloride, petroleum ether, petroleum benzine, ligroine, DMSO, and DMF. The binders other than polycarbosilane may be used following to the above described using process of polycarbosilane. The form of the binder of the present invention when said binder is mixed with SiC powders may be solid or fused state other than the above described solution form.

The binder is added in an amount of 0.3-30%, preferably 5-25%, more particularly 7-15% by weight based on SiC powders. The added amount is sufficient in such an amount that SiC powders are press molded and sintered and said amount is adjusted by the molding and sintering process. The resulting mixture is molded into a given shape. Alternatively, a hot press process wherein the mixture is heated in a mold and the press molding is effected in the course of sintering, may be used.

The sintering of the above described molding is effected by heating said molding at a temperature from room temperature to 2,200° C. under at least one of atmospheres of vacuum, inert gases, CO gas and hydrogen gas.

If the above heat treatment is effected in air, the binder is oxidized to form $SiO_2$, so that the heat treatment must be effected in a non-oxidizng atmosphere (inert gases, CO gas or hydrogen gas) under vacuum, atmospheric pressure or pressure.

When the above described heat treatment is effected under pressure in an atmosphere, a converted amount of the binder into SiC can be increased, so that SiC molding obtained by heating under pressure becomes more dense than SiC molding obtained under no pressure and the mechanical strength becomes larger. The heat treatment under pressure does not need to heat up to a high temperature and if the heating is effected from room temperature to 500°-800° C., at which the polycondensation of the organosilicon compounds and the organosilicon high molecular weight compounds is completed, the effect of the heating can be attained. A relation of the flexural strength and the bulk density to the heating pressure of SiC molding obtained by heating up to 600° C. under nitrogen gas pressure and then heating up to 1,300° C. in nitrogen gas atmosphere is shown in FIG. 9. As seen from FIG. 9, when the heating pressure is large, the bulk density of SiC molding becomes large and the flexural strength becomes large and the excellent product can be obtained, if the heating is effected under vacuum, when the organosilicon compound and the organosilicon high molecular weight compound of the binder of SiC molding is polycondensed, the formed gas is removed and the swelling upon the heating can be prevented.

The hot press process to be used in the present invention is one process for sintering refractory substance powders and the powders are not previously molded and are heated in a mold and the press molding is effected in the course of sintering and the powders are more compactly packed and a dense molding can be obtained.

In the hot press process industrially carried out, the temperature is usually 1,200°-2,600° C. and the pressure is 140-700 Kg/cm². The heating of furnace is generally effected electrically by resistance heating process or high frequency induction heating process.

In the resistance heating, the voltage is continuously varied rom 0 volt to 30 volts and as the current, an induction regulator of 15,000 amp is broadly applied and a resistance graphite tube for heating having a thickness of 1.3 cm, an outer diameter of 20 cm and a length of 150 cm is used. In the high frequency induction heating, 1,000-30,000 cycles per second can be used. In a small scale of hot press for producing a molding having a diameter of 2.5 cm and a length of 2.5 cm, 15 KVA at 30,000 cycles is preferable and in a large scale of molding having a diameter of 35 cm and a length of 25 cm, 300 KVA at 1,000 cycles is necessary.

The most simple press process is a lever type but this type is not convenient for adjusting the pressure. A ram type of oil pressure or air pressure is usually used.

If the mold is electrically conductive at a temperature of 1,200°-2,600° C. which is the press temperature, the heating can be directly made by a resistance or induction process, so that graphite is generally used. Graphite has many kinds but for the hot press, dense graphite having the highest strength and a high mechanical workability is suitable.

A detailed explanation will be made with respect to the course of self sintering of SiC upon the production of SiC sintered moldings. The organosilicon compounds and the organosilicon high molecular weight compounds used as the binder are thermally decomposed in the heat treatment and superfluous carbon and hydrogen volatilize and the remaining carbon and silicon react to form SiC, which bonds strongly to the added SiC powders. In this course, when the temperature is gradually raised in a sufficiently long time, the organosilicon compound or the organosilicon high molecular weight compound fills the grain boundary of SiC powders and finally becomes SiC while gradually reacting, and SiC sintering molding is formed. When the binder to be used in the present invention is converted into SiC, microcrystalline SiC is formed and the size of the crystal grain is usually 30-70 Å and the diameter of the crystal grain is far smaller than that of the heretofore known SiC sintered moldings, so that the surface area is considerably large and the apparent self diffusion coefficient of SiC becomes very large and in SiC sintered moldings of the present invention, the self sintering ability is increased and as the result, sintered moldings having a high strength can be obtained.

The above described SiC sintered moldings may contain free carbon and this free carbon can be removed by firing the sintered moldings at a temperature of 600°-1,700° C. under an oxidizing atmosphere. Even if the above described firing is effected at a temperature lower than 600° C., carbon cannot be removed, while the temperature exceeds 1,700° C., the oxidation reaction of SiC becomes excessive, so that such a high temperature is not preferable. The time of the above described firing under an oxidizing atmosphere varies depending upon the firing temperature, the size of the molding and the structure of the firing furnace and when the firing temperature is low, the firing must be effected for a long time, while when the firing temperature is high, the firing time may be short, but when the firing is effected at a low temperature for a relatively long time, an amount of $SiO_2$ formed is small and a good result can be obtained. For example, when the crucible produced by the present invention is fired at a temperature of 1,000° C. in air to remove free carbon, the firing time is preferred to be 1-3 hours.

In the present invention, an amount of the binder added is 0.3-30% by weight as mentioned above and when said amount is less than 0.3% by weight, it is difficult to obtain SiC sintered moldings, while when said amount is larger than 30% by weight, the sintered molding is swollen and cracks are caused, so that an amount of 0.3-30% by weight is not necessary. When the hot press process is used, the amount of 1-20% by weight is preferable and in the process wherein the mixture of SiC powders and the binder is press molded and then the molded mixture is fired, the amount of 5-25% by weight is preferable.

The inventors have found that SiC sintered moldings having more excellent properties can be obtained by using SiC powders prepared by the specific production process as explained hereinafter instead of the above described SiC powders following to the same manner for producing SiC sintered moldings as explained hereinbefore. The specific SiC powders are obtained as follows. The above described organosilicon high molecular weight compounds to be used as the binder in the present invention are preliminarily heated at a temperature of 400°-1,000° C. under vacuum, atmospheric pressure or pressure in a non-oxidizing atmosphere to form SiC primary product and then, if necessary, SiC primary product is further heated at a temperature of 1,000°-2,200° C. to form a fired product, and SiC primary product or the fired product is pulverized to form SiC powders.

A method for producing SiC powders from the organosilicon high molecular weight compounds, in which carbon and silicon are the main skeleton components, will be explained in detail hereinafter.

When the above described preliminary heating is effected or successively the firing is effected to the primary product, the organosilicon high molecular weight compounds further carry out the polycondensation reaction to form the compounds having the higher molecular weight and when these high molecular weight compounds are heated, silicon and carbon present in the side chains are easily decomposed and volatilized but silicon and carbon constituting the main skeleton components do not volatilize by the heating and bond to form SiC.

The primary product is amorphous SiC and further contains volatile components and if the primary product is heated at a high temperature, the volatile components are volatilized and the weight is decreased and shrinkage occurs. Accordingly, when the pulverized primary product is mixed with a binder, for example, polycarbosilane and the mixture is heated, the volatile components in polycarbosilane are volatilized and shrinkage occurs and simultaneously the SiC primary product shrinks, so that cracks are not caused and a sintered molding having a high strength can be obtained.

Furthermore, SiC powders obtained by further firing the primary product completely coincide with SiC obtained by firing the binder of the present invention, so that the adhesion of the binder to SiC powders is good and no formation of cracks due to the difference of thermal expansion occurs.

The atmosphere wherein the preliminary heating is carried out, is at least one of atmospheres of vacuum, inert gases, CO gas, hydrogen gas, an organosilicon compound gas and hydrocarbon gas. The temperature of the preliminary heating is 400°-1,000° C., preferably 500°-800° C.

When the preliminary heating is effected under pressure, the yield of SiC primary product can be increased. When the preliminary heating is effected under vacuum, the gases generated in polycondensation and decomposition reactions of the above described organosilicon high molecular weight compounds can be easily removed but the yield when the preliminary heating is effected under pressure, is larger than that in the case under vacuum.

The preliminary heating may be carried out by two processes of delayed process and fluid process. An embodiment of production apparatus in the delayed process is shown in FIG. 2. 101 and 102 are reaction columns, 103 is a heating furnace, 104 is a fractionating column and 105 is a valve. In this apparatus, the organosilicon high molecular weight compound is charged through the valve 105 and rapidly heated within a temperature range of 400°-1,000° C. at the heating furnace 103 and then fed into the reaction column 101. In the reaction column, the decomposition reaction proceeds and hydrogen gas, low molecular weight hydrocarbons, low molecular weight organosilicon compounds and other gases, and a liquid are formed and SiC primary product block remains in the reaction column 101. The above described gases and the liquid are fed into the fractionating column 104, in which the gases and the liquid are separated and the gases are discharged from the fractionating column and the liquid is recycled into the heating furnace 103.

SiC primary product produced by the above described delayed or the fired SiC obtained by firing the SiC primary product at a high temperature contains a large number of pores and the specific gravity is small. The bulk density of the above described fired SiC is 1.5-2.2 and is fairly lower than the specific gravity of SiC crystal of 3.21. The yield of SiC primary product in the above described delayed process varies depending upon the average molecular weight of the starting material of the organosilicon high molecular weight compounds and the reaction pressure.

Namely, when the reaction pressure is 1 atmosphere, the reaction of the yield of SiC primary product to the average molecular weight of the organosilicon high molecular weight compound is shown in FIG. 4. As seen from FIG. 4, the yield of SiC primary product increases, as the average molecular weight of the organosilicon high molecular weight compound becomes larger but when the average molecular weight approaches 5,000, the yield becomes substantially constant. The relation of the yield of SiC primary product to the reaction pressure is shown in FIG. 5. As seen from FIG. 5, as the reaction pressure increases, the yield of SiC primary product increases but when the reaction pressure becomes more than 8 Kg/cm$^2$, the yield becomes substantially constant.

An embodiment of production apparatus in the fluid process is shown in FIG. 3. 201 is a compressor for feeding an inert gas, 202 and 203 are fluidized beds, 204 and 205 are tubes for flowing SiC primary product block, 206 is a fractionating column and 207 is a valve.

In the above described apparatus, the organosilicon high molecular weight compound is charged into the fluidized bed 203 heated within a range of 400°-1,000° C. through the valve 207. SiC primary product produced in this fluidized bed 203 is fed into the fluidized bed 202 from the lower portion of the fluidized bed 203 through a tube 205 and dried by air fed from the compressor 201 and fed again into the fluidized bed 203 through the tube 204 and mixed with the starting material of the organosilicon high molecular weight compound and the mixture is reacted. The gases formed in the fluidized bed 202 are discharged from the reaction system and the gases and the liquid formed in the fluidized bed 203 are separated in the fractionating column 206 and the separated gas is discharged from the reaction system and the liquid is recycled into the fluidized bed 203.

SiC primary product produced by the above described fluid process and SiC obtained by firing the primary product have a circular onion-shaped structure and have a bulk specific gravity of 1.7–2.7, which is larger than that of the product formed in the delayed process. The yield of SiC primary product in the fluid process is 5–20% and is not greatly varied depending upon the average molecular weight of the starting material of the organosilicon high molecular weight compound and the reaction pressure.

A structure of SiC powders of SiC primary product formed by the above described preliminary heating is explained hereinafter X-ray diffraction patterns of SiC powders obtained by the preliminary heating at 800° C. is shown in FIG. 6. As seen from this diffraction patterns, there are two broad diffraction peaks, the center of which is $2\theta \approx 36.5°$ and $2\theta \approx 65°$, respectively and this X-ray diffraction pattern shows that the structure of SiC primary product is amorphous. The peak of $2\theta \approx 26.5°$ is based on (002) plane of graphite and it is recognized that graphite crystal coexists in silicon carbide heated at 800° C.

The above described SiC primary product may be heated at a temperature of 700°–2,200° C., preferably 1,000°–2,000° C. under at least one of atmospheres of vacuum, inert gases, CO gas and hydrogen gas to form heat-treated silicon carbide.

When the above described heating is effected in air, SiC primary product is oxidized to form $SiO_2$, so that said heat treatment must be effected in at least one of atmospheres of vacuum, inert gases, CO gas and hydrogen gas. Moreover, the above described heat treatment may be effected by embedding SiC primary product in coke granules.

In the above described heat treatment, when the heating temperature is higher than 2,200° C., the decomposition of SiC is violent, so that the heat treatment should be effected at a temperature lower than 2,200° C.

The heat-treated silicon carbides obtained by varying the above described heating temperature were pulverized and the resulting powders were determined with respect to the X-ray diffraction and the obtained results are shown in FIG. 6. As shown in FIG. 6, in the powders heat-treated at 1,500° C., SiC crystal does not fully grow but in the powders heat-treated at a temperature higher than 2,000° C., SiC crystal grows fully and is $\beta$-SiC. Furthermore, the coexistence of graphite crystal shown by the diffraction peak of $2\theta = 26.5°$ is recognized in the above described heat-treated SiC as shown in the X-ray diffraction pattern.

The silicon carbide sintered moldings are produced from the above described SiC primary product or the heat-treated SiC in the following manner. The above described SiC primary product or the heat-treated SiC is pulverized to form granules and powders and the compounding ratio of the resulting granules and powders are adjusted depending upon the form of the moldings and then the organosilicon compound or the organosilicon high molecular weight compound as a binder is added thereto in the described manner and the mixture is mixed and then press molded into a molding having a given shape, after which the molded mixture is heated from room temperature to 2,200° C. in at least one of atmospheres of inert gases, CO gas, hydrogen gas, if necessary under pressure or vacuum. When the above described heating is effected under pressure, the yield of SiC of the binder can be increased, so that SiC sintered moldings having a high strength can be obtained, while when the above described heating is effected under vacuum, the formed gas is conveniently volatilized but the yield of SiC is decreased.

In the above described heating, if the temperature is gradually raised in a sufficient time, the yield of SiC in the binder is improved and the shrinkage of the molding can be uniformly effected, so that the dense molding can be obtained.

The above described SiC sintered moldings may contain free carbon. This free carbon may be removed by heating such SiC sintered moldings at a temperature of 600°–1,700° C. under an oxidizing atmosphere as already explained.

The inventors have found a method for producing SiC fibers having an extremely high strength from the organosilicon high molecular weight compounds, in which silicon and carbon are the main skeleton components and already filed as a patent application of U.S. patent Ser. No. 677,960 filed on Apr. 19, 1976.

A brief explanation will be made with respect to one embodiment for producing SiC fibers.

A content of low molecular weight compounds contained in the organosilicon high molecular weight compounds is decreased, the thus treated high molecular weight compounds are spun by melt spinning process or dry spinning process into filaments having a diameter of 5–100 $\mu$, if necessary the spun filaments are heat treated in air at a temperature lower than 300° C., the filaments are preliminarily heated under vacuum at a temperature of 350°–800° C. to volatilize the remaining low molecular weight compounds, and then the thus treated filaments are baked at a temperature of 800°–2,000° C. under vacuum, an inert gas, CO gas or hydrogen gas to form SiC fibers.

The inventors have further found that the thus formed SiC fibers are preferable for aggregate of SiC sintered moldings instead of SiC powders.

The compounding ratio of the binder to SiC fibers is the same as in the case of SiC powders.

SiC fibers can be used in any form of staple fibers and long filaments. When SiC fibers are used in staple fibers, the following merits can be obtained. When the above described SiC primary product or the fired SiC block is pulverized to form SiC powders, over-pulverizing occurs and it is impossible to obtain only the powders having a given particle size but when a bundle of fibers are cut by a cutter to a given length, the fibers have the given length can be easily obtained. When the SiC staple fibers having a uniform length are used as the aggregate, the compounding ratio of the binder is always constant and the physical properties of the obtained sintered moldings are uniform.

The strength of SiC sintered moldings obtained by arranging the long SiC fibers, adding the binder of the organosilicon high molecular weight compound thereto and heating the mixture, is very large in the fiber direction and a flexural strength of 20 Kg/mm$^2$ is easily obtained.

Heretofore, SiC sintered moldings having a high strength of more than 5 Kg/mm$^2$ of flexural strength have not been obtained, unless the bulk density is more than 3.05 g/cm$^3$ as in KT SiC of Carborundum Co., the hot pressed SiC of Norton Co. and the self sintered SiC of GE Co. A relation of the bulk density to the flexural strength of SiC sintered molding of the present invention is shown in FIG. 7. As shown in FIG 7, even though the bulk density is very low as 2.35 g/cm$^3$, the flexural strength is large as 5.5 Kg/mm$^2$ and when the bulk density becomes 2.5 g/cm$^3$, the flexural strength becomes 17 Kg/mm$^2$. The flexural strength of 17 Kg/mm$^2$ is as same as the flexural strength (17 Kg/mm$^2$) of the KT SiC molding. Such SiC moldings having a high strength at a bulk density of lower than 3.05 g/cm$^3$ and this is a merit of the present invention.

An oxidation resistance of SiC sintered moldings of the present invention is very excellent and even if SiC sintered moldings are heated at a high temperature in air, the weight increase due to oxidation is far smaller than that of the conventional SiC sintered moldings. SiC sintered molding of the present invention (bulk density: 2.5 g/cm$^3$) and SiC sintered molding of Norton Co. (bulk density: 3.29 g/cm$^3$) were subjected to oxidation test and the obtained results are shown in FIG. 8.

SiC sintered molding of the present invention is low in the bulk density as 2.5 g/cm$^3$ and fine pores of 32% is present, while the bulk density of the conventional SiC sintered moldings is large as 3.29 g/cm$^3$ and no fine pore is present. Nevertheless, as seen from FIG. 8, even if SiC sintered molding of the present invention is heated at the high temperature for a long time in air, the weight increase is about half of the conventional SiC sintered molding. This is because in SiC sintered molding of the present invention, SiC powders are bonded by SiC formed from the organosilicon high molecular weight compound of the binder, while in the conventional SiC sintered molding, SiC powders are bonded by alumina, boron, metallic silicon and the like. The oxidation resistance of SiC sintered moldings of the present invention is high.

Furthermore, SiC moldings of the present invention do not shrink upon heat treatment and the shape before heating can be maintained even after heating. Therefore, SiC sintered molding having a high preciseness or a high dimension preciseness can be obtained. In the conventional SiC sintered moldings, it has been impossible to obtain complicated shapes and the dimension preciseness is very poor and it has been considered that SiC sintered moldings having a high dimension preciseness cannot be obtained.

The present invention will be explained in more detail.

For a better understanding of the invention, reference is taken to the accompanying drawings, wherein:

FIGS. 4 and 5 are views showing a relation of an average molecular weight of the organosilicon high molecular weight compound to the yield of SiC primary product in the delayed process and a relation of the reaction pressure to the yield of SiC primary product in the delayed process, respectively;

FIG. 6 shows X-ray diffraction patterns of silicon carbides heat-treated at various temperatures;

Figure 1:
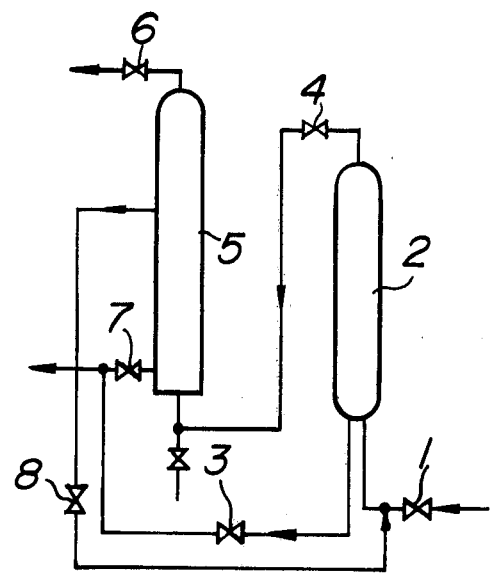
FIG. 1 shows a diagrammatic view of an apparatus for producing the organosilicon high molecular weight compounds, in which silicon and carbon are the main skeleton components, from organosilicon compounds.

The following examples are given for the purpose of illustration of this invention and are not intended as limitations thereof. In the examples, "%" and "parts" mean by weight unless otherwise indicated.

EXAMPLE 1

Dodecamethylcyclohexasilane was heat treated in an autoclave at 400° C. for 36 hours under argon atmosphere to obtain a liquid polycarbosilane having an average molecular weight of 800. 30 g of powdery SiC of 99.90% purity having a particle size of about 400 meshes was thoroughly kneaded together with 5 g of the above obtained polycarbosilane, and the resulting mixture was press molded into a crucible. Then the crucible was fired by heating the crucible from room temperature to 1,800° C. in 8 hours under a vacuum of $1 \times 10^{-4}$ mmHg to obtain an SiC sintered crucible having a bulk density of 2.3. g/cm$^3$. When the resulting SiC sintered crucible was used in the melting of metallic silicon, the crucible was remarkably longer in the life and was remarkably smaller in the decrease of purity of the melted metallic silicon due to impurity than conventional SiC crucibles.

EXAMPLE 2

In an autoclave, 10 g of linear polydimethylsilane produced from dimethyldichlorosilane was heated at 400° C. for 30 hours under a pressure of 30 atmosphere under argon atmosphere to obtain 6.3 g of polycarbosilane. The average molecular weight of the polycarbosilane was adjusted to 1,500. 50 g of powdery SiC of 99.75% purity produced from metallic silicon and carbon and having less than a particle size of 325 meshes was kneaded together with 5 g of the above obtained polycarbosilane as a binder, and the resulting mixture was charged into a graphite mold for producing a nozzle, and gradually heated up to 1,500° C. in 10 hours under vacuum ($1 \times 10^{-4}$ mmHg) by a high-frequency induction furnace, while applying a pressure of 200 Kg/cm$^2$ to the mixture by a hot press, to obtain a SiC sintered nozzle having a bulk density of 2.4 g/cm$^3$. The resulting SiC sintered nozzle was further kept at 1,000° C. for 3 hours in air in order to decrease the carbon content into a very small amount.

A metallic silicon ribbon was produced by using the above obtained SiC sintered nozzle. When the SiC nozzle was compared with SiC nozzles produced by conventional processes, the SiC sintered nozzle was longer in the life and was very smaller in the decrease of purity of the metallic silicon.

EXAMPLE 3

In an autoclave, 10 g of linear polydimethylsiloxane synthesized from dimethyldichlorosilane was heated at 430° C. for 30 hours under pressure of 30 atm. under argon atmosphere to obtain 6.3 g of polycarbosilane. The average molecular weight of the polycarbosilane was adjusted to 1,500. 50 g of powdery SiC was kneaded together with a solution of 8 g of the above obtained polycarbosilane in 50 ml of xylene. After the xylene was removed under a reduced pressure, the resulting mixture was heated and molded into a rod. The rod was heated from room temperature to 600° C. in 12 hours in the pressure of 40 Kg/cm$^2$ of argon atmosphere and then heated from 600° C. to 1,300° C. for 7 hours under argon atmosphere to obtain an SiC sintered rod having a bulk density of 2.42 g/cm$^3$. The SiC sintered rod was further kept at 900° C. for 4 hours in air to obtain an SiC sintered rod having a bulk density of 2.42 g/cm$^3$ and a flexural strength of 12 Kg/mm$^2$.

When the resulting SiC sintered rod was used as a heating element, the life of the heating element was about 30% longer than that of conventional SiC heating elements.

EXAMPLE 4

1,3-Disilacyclobutane was heated in an autoclave at 350° C. for 40 hours under argon atmosphere to obtain a solid organosilicon high molecular weight compound having an average molecular weight of 15,000. 50 g of powdery SiC was kneaded together with 2.0 g of powders of the above obtained organosilicon high molecular weight compound as a binder, and the resulting mixture was charged into a graphite molding and gradually heated up to 1,750° C. in 12 hours under argon atmosphere by a high-frequency induction furnace, while applying a pressure of 700 Kg/cm$^2$ to the mixture by a hot press, to obtain a SiC sintered nozzle having a density of 2.40 g/cm$^3$.

When high purity silicon was gradually extruded through the resulting SiC nozzle, a semiconductor was able to be obtained.

EXAMPLE 5

Dodecamethylcyclohexasilane was heat treated in an autoclave at 450° C. for 36 hours under argon atmosphere to obtain a liquid organosilicon high molecular weight compound. The organosilicon high molecular weight compound was dissolved in n-hexane, and acetone was added to the solution to obtain an acetone-insoluble solid organosilicon high molecular weight compound having an average molecular weight of 3,200. 50 g of commercially available powdery SiC having an average particle size of 320 meshes was kneaded together with 2.5 g of powders of the above obtained solid acetoneinsoluble organosilicon high molecular weight compound as a binder, and the resulting mixture was charged into a graphite mold for producing a pipe and gradually heated up to 1,750° C. in 12 hours under vacuum ($1 \times 10^{-4}$ mmHg) by a high-frequency induction furnace, while applying a pressure of 200 Kg/cm$^2$ to the mixture by a hot press, to obtain an SiC sintered pipe having a bulk density of 2.40 g/cm$^3$.

When the resulting SiC sintered pipe was used in a still for zinc, the life of the SiC sintered pipe was considerably longer than that of conventional SiC pipes.

EXAMPLE 6

Octaphenylcyclotetrasilane was heated in an autoclave at 420° C. for 20 hours under argon atmosphere to obtain a solid organosilicon high molecular weight compound. 50 g of powdery SiC of 99.5% purity having a particle size of 400 meshes was kneaded together with 1.0 g of powders of the above obtained organosilicon high molecular weight compound as a binder, and the resulting mixture was charged in a graphite mold for producing a nozzle and gradually heated up to 1,750° C. under argon atmosphere by a high-frequency induction furnace, while applying a pressure of 5 t/cm$^2$ to the mixture by a hot press, to obtain an SiC sintered nozzle having a bulk density of 2.45 g/cm$^3$.

When the melted high purity silicon was extruded through the resulting SiC sintered nozzle, a semiconductor was able to be obtained.

EXAMPLE 7

A solution of 3 g of octaphenyltrisilane [($C_6H_5$)$_3$SiSi($C_6H_5$)$_2$Si($C_6H_5$)$_3$] in benzene was thoroughly kneaded together with 30 g of powdery SiC of 99.9% purity having an average particle size of 450 meshes. After the solvent was evaporated, the resulting mixture was press molded into a cylindrical rod. The rod-shaped molding was fired by heating the molding from room temperature to 1,300° C. in 8 hours under argon atmosphere to obtain an SiC sintered rod having a bulk density of 2.35 g/cm$^3$. The SiC sintered rod was kept at 800° C. for 3 hours in air. The thus treated SiC sintered rod contained less than 0.2% of free carbon and other impurities.

When the SiC sintered rod was used as a heating element, the life of the heating element was at least 20% longer than that of the conventional SiC heating elements.

EXAMPLE 8

A solution of 4 g of p-bis(dimethylvinylsilyl)-benzene [$CH_2$=$CHSi(CH_3)_2C_6H_4Si(CH_3)_2CH$=$CH_2$] in xylene was thoroughly kneaded together with 30 g of powdery SiC of 99.9% purity having an average particle size of 450 meshes. After the solvent was evaporated, the resulting mixture was charged into a graphite mold for producing a pipe and gradually heated up to 1,400° C. in 12 hours under argon atmosphere by a high-frequency induction furnace, while applying a pressure of 700 Kg/cm$^2$ to the mixture by a hot press, to obtain an SiC sintered pipe having a bulk density of 2.45 g/cm$^3$.

Further, SiC sintered moldings can be obtained in the same manner as described in this example by using organohalogenosilane or organohydrosilane having relatively high melting point and boiling point as a binder in place of the above described silicon compound.

EXAMPLE 9

A mixture consisting of about 78% of dimethyldichlorosilane, about 8% of methyltrichlorosilane, about 3% of trimethylchlorosilane, about 2% of methyldichlorosilane and about 9% of the remainder, which was obtained by direct synthesis of methyl chloride and silicon, was used as a starting material, and an organosilicon high molecular weight compound was produced by means of the apparatus shown in FIG. 1 in the following manner. Air in the whole apparatus was firstly purged with nitrogen gas, and the above described mixture was fed into a reaction column 2 heated to 750° C. at a rate of 15 l/hr to effect a polycondensation reaction therein. The reaction product was fed into a fractionating column 5, and was separated into gas, liquid, and organosilicon high molecular weight compound therein. The gas containing large amounts of propane and hydrogen was exhausted from the reaction system through a valve. The liquid was recycled into the reaction column 2. The organosilicon high molecular weight compound was partly taken out from the reaction column 2 and further taken out from the fractionating column 5.

Figure 2:
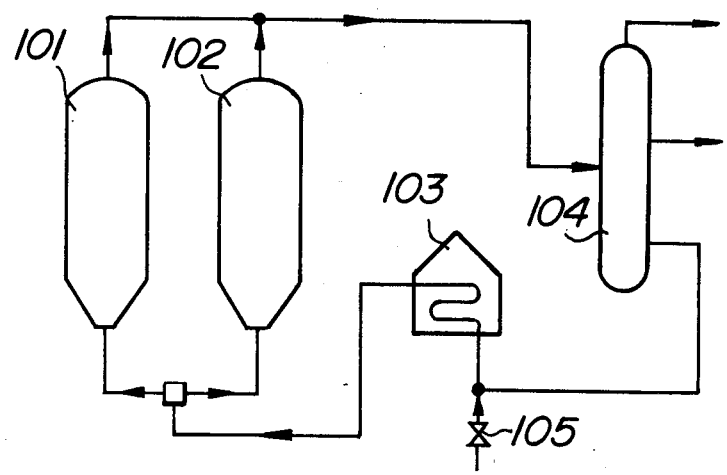
FIGS. 2 and 3 show diagrammatic views of apparatuses of the delayed process and the fluid process for producing SiC primary product from the organosilicon high molecular weight compounds, respectively.

Then, by using the apparatus shown in FIG. 2, the resulting organosilicon high molecular weight compound was fed into a heating furnace 103 at a rate of 3 l/hr, and rapidly heated up to 550° C. therein, and then fed into a reaction column 101 kept at atmospheric pressure. The gas-liquid mixture formed in the reaction column 101 was separated into gas and liquid in a fractionating column 104. The gas was exhausted from the reaction system, and the liquid was recycled and again heated in the heating furnace 103. The SiC primary product block obtained in this reaction was taken out from the reaction column 101 and pulverized into granules and powders. Among the resulting granules and powders, 30 parts of granules having a particle size of 50–100 meshes, 30 parts of granules having a particle size of 200–250 meshes and 25 parts of powders having less than a particle size of 325 meshes were mixed together with 15 parts of the above obtained organosilicon high molecular weight compound, which had previously been dissolved in n-hexane. After the n-hexane was evaporated, the resulting mixture was press molded into a brick. The brick was fired by heating the brick up to 1,800° C. in nitrogen gas to obtain a silicon carbide brick having a bulk density of 2.2 g/cm$^3$ and a flexural strength of 6 Kg/mm$^2$.

EXAMPLE 10

The SiC primary product block obtained in Example 9 was fired by heating the block up to 800° C. under argon atmosphere, and pulverized into granules and powders. Among the resulting granules and powders, 60 parts of granules having a particle size of 150–200 meshes and 25 parts of powders having less than a particle size of 325 meshes were mixed together with 15 parts of an organosilicon high molecular weight compound (polycarbosilane synthesized from polysilane) as a binder while heating, and the resulting mixture was press molded into a crucible. The crucibleshaped molding was placed in coke granules, heated from room temperature to 500° C. in 6 hours, then from 500° C. to 900° C. in 10 hours and further up to 1,800° C. in 4 hours to obtain a silicon carbide crucible consisting mainly of SiC. The crucible was further heated at 900° C. for 4 hours in air to obtain a silicon carbide crucible.

EXAMPLE 11

Air in the whole apparatus shown in FIG. 1 was firstly purged with nitrogen gas in order to produce an organosilicon high molecular weight compound from hexamethyldisilane as a starting material. The starting material was fed into a reaction column 2 heated to 740° C. at a rate of 12 l/hr to carry out a polycondensation reaction therein. The reaction product was fed into a fractionating column 5 and separated into gas, liquid and the organosilicon high molecular weight compound therein. The gas was exhausted from the reaction system, and the liquid was recycled into the reaction column 2. The organosilicon high molecular weight compound was partly taken out from the reaction column 2 and further taken out from the fractionating column 5.

Figure 3:
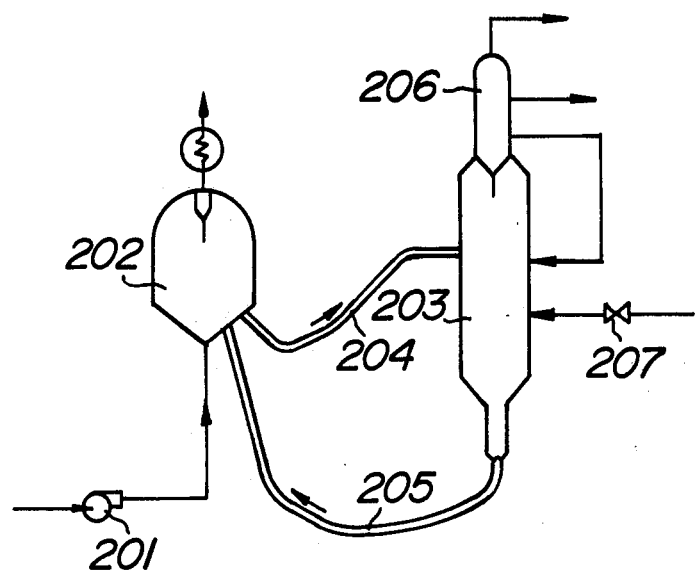
Figure 4:
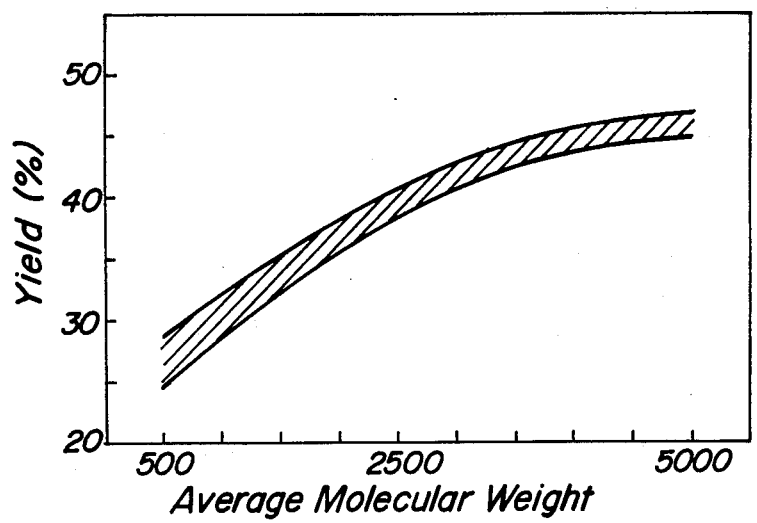
Figure 7:
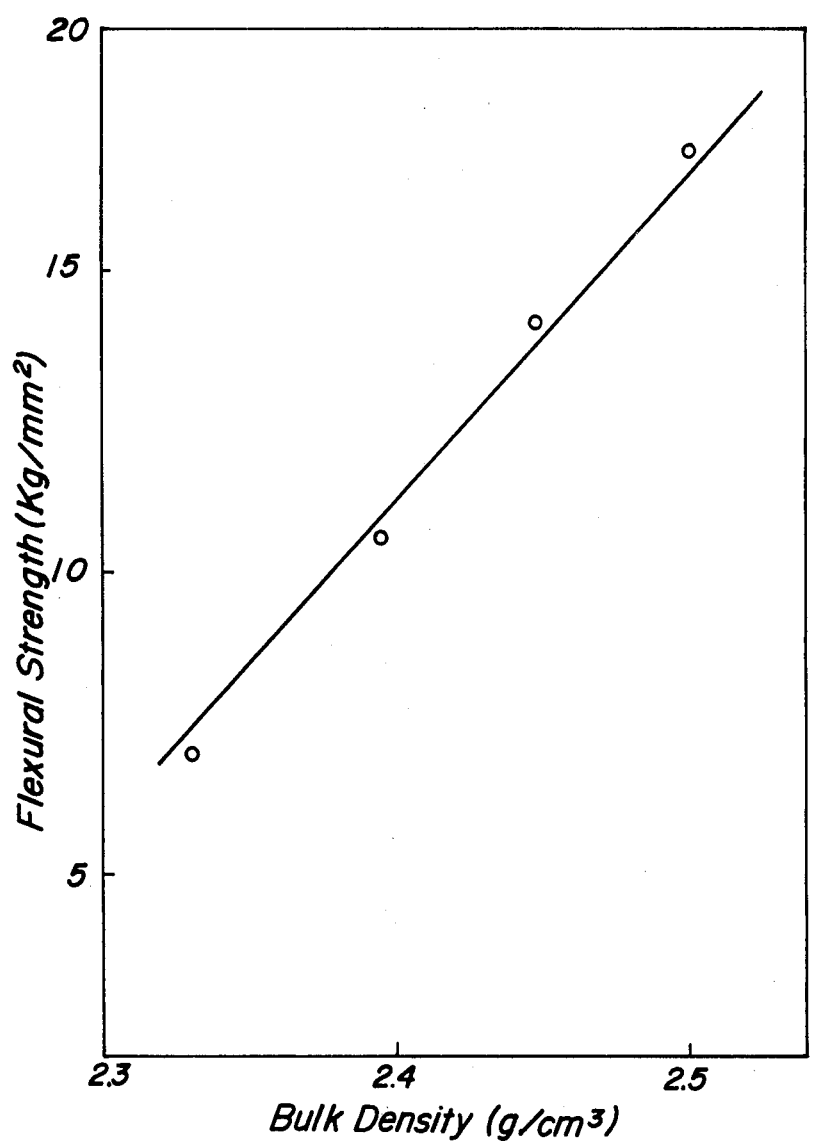
FIG. 7 is a diagram showing a relation of the flexural strength to the bulk density of SiC sintered moldings of the present invention.
Figure 8:
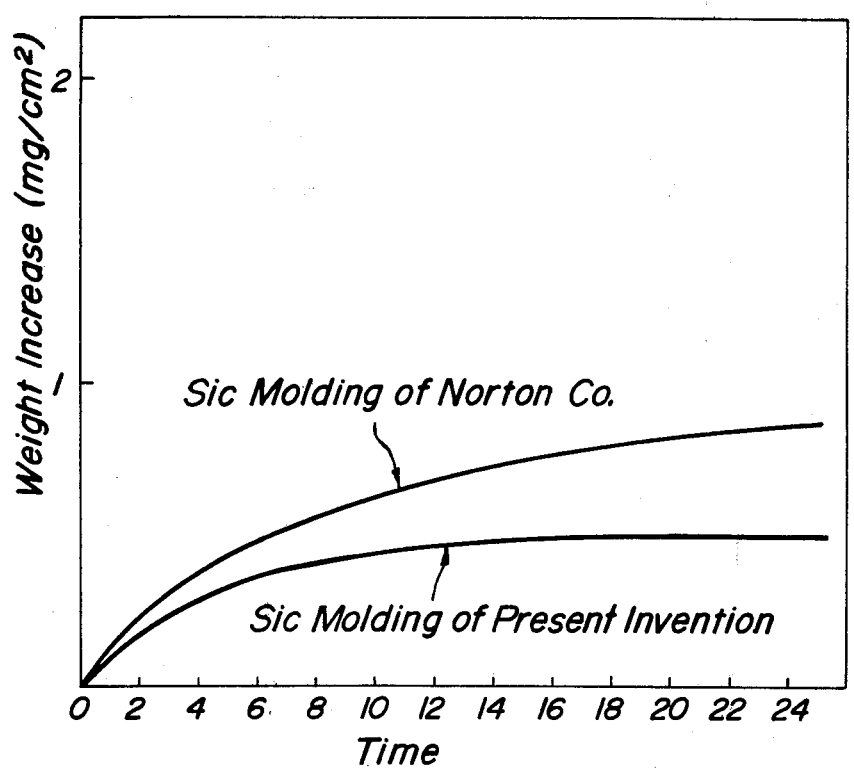
FIG. 8 is a diagram showing a relation of the weight increase in oxidation to the time of SiC sintered moldings of the present invention and Norton Co.
Figure 9:
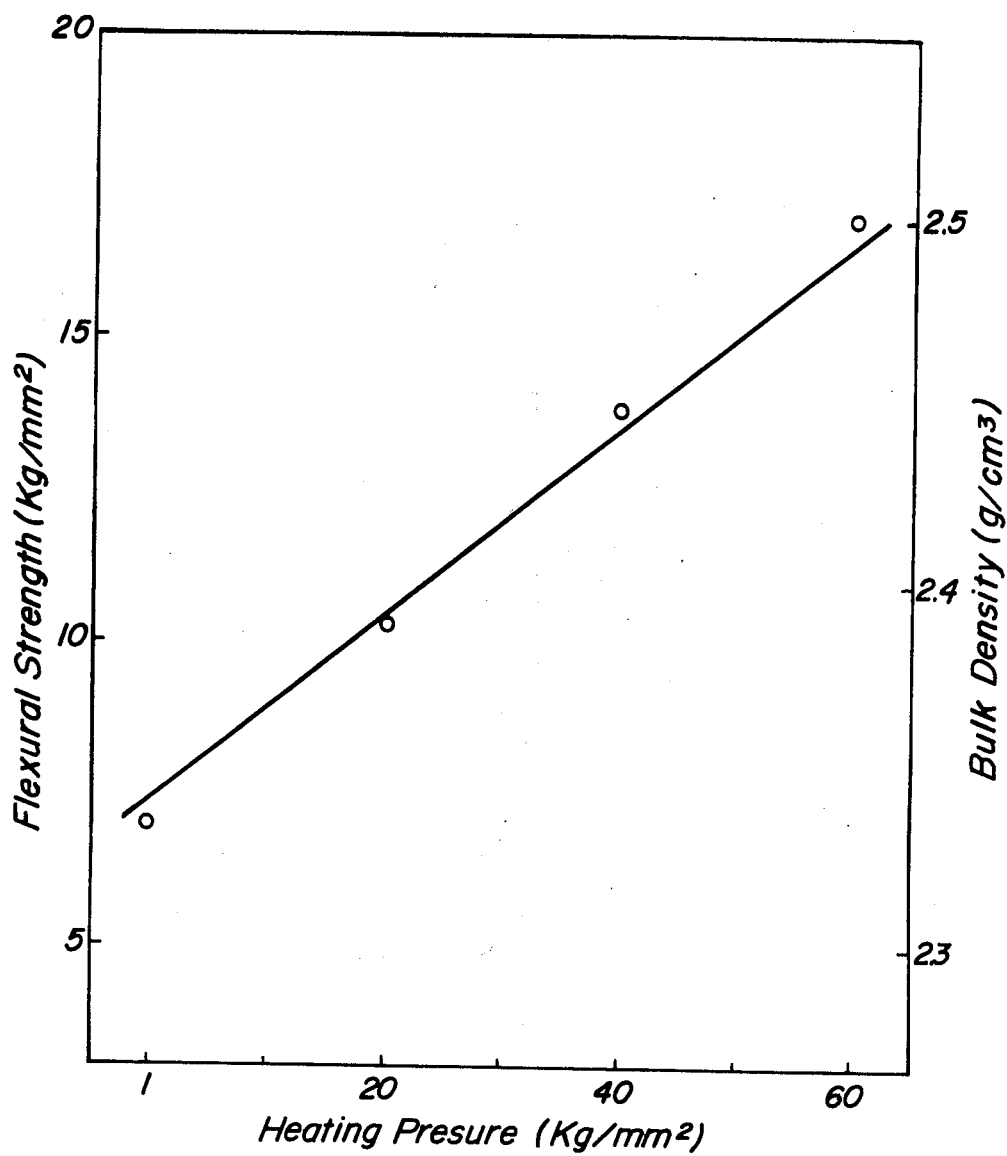
FIG. 9 is a diagram showing a relation of the heating pressure to the flexural strength and the bulk density of SiC sintered molding of the present invention.

By the use of the apparatus shown in FIG. 3, the above obtained organosilicon high molecular weight compound was used as a starting material, and an SiC primary product block was produced in a reaction column 203 heated to 680° C. The resulting SiC primary product block was placed in coke granules and fired by heating the block up to 1,100° C., and then pulverized into granules and powders. Among the resulting granules and powders, 58 parts of granules having a particle size of 150–200 meshes and 30 parts of powders having less than a particle size of 325 meshes were mixed together with 12 parts of an organosilicon high molecular weight compound, which had previously been dissolved in n-hexane. After the n-hexane was evaporated, the resulting mixture was press molded into a tube. The tube-shaped molding was heated in coke granules from room temperature to 1,300° C. in 12 hours to to obtain a silicon carbide tube having a bulk density of 2.3 g/cm$^3$ and a flexural strength 6.0 Kg/mm$^2$.

EXAMPLE 12 p-Bis(oxydimethylsilyl)benzene,

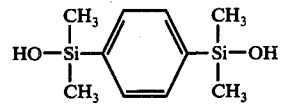

was polymerized into an organosilicon high molecular weight compound having an average molecular weight of 5,000 in the presence of potassium hydroxide catalyst.

An SiC primary product was produced from the above obtained organosilicon high molecular weight compound by means of the apparatus shown in FIG. 2. Air in the whole apparatus was firstly purged with nitrogen gas. The above described starting material was fed into a heating furnace 103 at a rate of 5 l/hr, rapidly heated up to 560° C. therein and then fed into a reaction column 101 kept at atmospheric pressure. The gas-liquid mixture formed in the reaction column 101 was separated into gas and liquid in a fractionating column 104, and the liquid was recycled into the heating furnace 103. The SiC primary product formed in the reaction column 101 had a bulk density of 1.4 g/cm$^3$, and the yield of the product based on the starting material was 25%. After the SiC primary product was fired by heating the product up to 1,100° C. in nitrogen gas, the product was further fired at 1,000° C. for 4 hours in air to remove free carbon, and then pulverized into granules and powders. Among the resulting granules and powders, 20 parts of granules having a particle size of 30–60 meshes, 10 parts of granules having a particle size of 100–325 meshes, 20 parts of granules having a particle size of 200–325 meshes and 35 parts of powders having less than a particle size of 325 meshes were mixed together with 15 parts of an organosilicon high molecular weight compound dissolved in toluene. After removing the toluene, the resulting mixture was molded into a rod having a diameter of 10 mm and a length of 40 cm. The rod-shaped molding was placed in coke granules and fired by heating the molding from room temperature to 1,300° C. in 48 hours to obtain a silicon carbide rod having a bulk density of 2.30 g/cm$^3$ and a flexural strength of as high as 6.0 Kg/mm$^2$.

EXAMPLE 13

A mixture of N,N'-diphenyldiaminodimethylsilane,

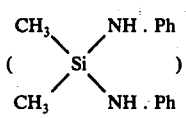

and p-dihydroxybenzene was heated and reacted to obtain an organosilicon high molecular weight compound having an average molecular weight of 8,000. An SiC primary product was produced from the organosilicon high molecular weight compound by means of the apparatus shown in FIG. 2. Air in the whole apparatus was firstly purged with nitrogen gas. The above described starting material was fed into a heating furnace 103 at a rate of 4 l/hr, rapidly heated up to 550° C. therein and then fed into a reaction column 101 kept at 4 atm. The gas-liquid mixture formed in the reaction column 101 was fed into a fractionating column 104 and separated into gas and liquid therein, and the liquid was recycled into the heating furnace 103. The SiC primary product formed in the reaction column 101 had a bulk density of 1.5 g/cm$^3$, and the yield of the product based on the starting material was about 35%. After the SiC primary product was fired by heating the product up to 1,300° C. in nitrogen gas, the product was pulverized into granules and powders. Among the resulting granules and powders, 80 parts of powders having less than a particle size of 325 meshes was mixed together with 20 parts of the above described organosilicon high molecular weight compound while heating, and the resulting mixture was press molded into a boat. The boat-shaped molding was placed in coke granules and fired by heating the molding up to 2,200° C. in 12 hours to obtain a silicon carbide boat having a bulk density of 2.2 g/cm$^3$ and a flexural strength of 8 Kg/mm$^2$.

EXAMPLE 14

Dodecamethylcyclohexasilane was heat treated in an autoclave at 400° C. for 48 hours to obtain an organosilicon high molecular weight compound. The organosilicon high molecular weight compound was treated with a solvent, and only polycarbosilane having an average molecular weight of 1,500 was gathered. The polycarbosilane was melted and extruded into air through a nozzle, and the extruded fibers was drawn to obtain fibers having a diameter of 10–20 microns by means of a melt spinning process. The fibers were heated at 200° C. for 3 hours in air to be made infusible, and then the infusible fibers were fired by heating the fibers up to 1,300° C. under vacuum to obtain silicon carbide fiber. The silicon carbide fibers were cut into a length of 2–3 mm, and 100 g of the short cut fibers and 15 g of the described polycarbosilane was mixed by means of a V-type mixer. The resulting mixture was charged into a metal mold heated to 300° C., compressed under a pressure of 500 Kg/cm$^2$, and kept for 30 minutes. After the polycarbosilane was completely melted and filled in the space between the short cut fibers, the metal mold was left to stand to be cooled to room temperature, and then the molding was taken out from the mold to obtain a dense molding. The resulting molding was heated at 200° C. for 24 hours in air, and then heated up to 1,200° C. in 8 hours in nitrogen gas to obtain a sintered body having a bulk density of 2.3 g/cm$^3$, a porosity of 38% and a flexural strength of 9 Kg/cm$^2$.

EXAMPLE 15

In an autoclave of 1 l capacity, 250 g of polydimethylsilane, which is obtained by reacting dimethyldichlorosilane and metallic sodium, was reacted at 470° C. for 14 hours. After completion of the reaction, the reaction product was taken out from the autoclave in the form of an n-hexane solution. After the n-hexane solution was filtered, the filtrate was concentrated by heating the filtrate up to 280° C. under a reduced pressure by a vacuum pump to obtain polycarbosilane. The resulting polycarbosilane was heated up to 320° C. and spun into polycarbosilane fibers having an average diameter of 13 μm by means of a spinning apparatus provided with a spinneret having a diameter of 300 μm. The resulting polycarbosilane fibers were heated up to 190° C. in 5 hours in air to be made infusible. In nitrogen gas, the resulting infusible fibers were heated up to 1,400° C. at a rate of 100° C./hr and then kept at 1,400° C. for 1 hour to obtain silicon carbide fibers having an average diameter of 10 μm, a strength of 400 Kg/mm$^2$, a modulus of elasticity of 2.7×10$^4$ Kg/mm$^2$. The silicon carbide fibers were cut into a length of 200 mm. 93 parts of the silicon carbide fibers were arranged in a mold having a dimension of 10×10×200 mm and 7 parts of the above obtained polycarbosilane dissolved in n-hexane was fed into the mold. After the n-hexane was evaporated, the resulting mixture was press molded into a molding, and the molding was fired by heating the molding up to 1,500° C. at a rate of 100° C./hr in nitrogen gas to obtain an SiC molding having a bulk density of 2.0 g/cm$^3$, a flexural strength in the length direction of fiber of as high as 21 Kg/mm$^2$.

As described above, the silicon carbide sintered molding obtained in the present invention can be used as firebrick, refractory block, refractory granule, crucible, boat, pipe, heating element, electric resistor, abrasive material, heat exchanger, acid proof vessel and the like.

What is claimed is:

1. A method for producing SiC sintered moldings, which comprises mixing SiC powders with 0.3–30% by weight of a binder consisting essentially of organosilicon high molecular weight compounds having silicon and carbon as the main skeleton components, which have been produced through polycondensation reaction of polysilane compounds having Si—Si bond, molding the resulting mixture into a desired shape and heating the molding at a temperature of not higher than 2,200° C. under a non-oxidizing atmosphere to form SiC sintered molding.

2. The method according to claim 1, wherein said polysilane compounds having Si—Si bond are polydimethylsilanes.

3. The method according to claim 1, wherein the mixture of SiC powders and the binder is press molded by a hot press process, during which sintering is effected.

4. The method according to claim 1, wherein the sintering step of SiC powders is effected under a pressure of a non-oxidizing atmosphere selected from the group consisting of inert gases, CO gas or hydrogen gas.

5. The method according to claim 1, wherein the material which is used as said SiC powders has been obtained by preliminarily heating said organosilicon high molecular weight compounds at a temperature of 400–1000 C. under vacuum or non-oxidizying atmosphere; to form SiC primary product and by pulverizing the primary product.

6. The method according to claim 5, wherein said primary product after said preliminarily heating for its formation is heated at a temperature of 1,000°–2,200° C. under vacuum or at least one of the atmospheres selected from the group consisting atmosphere of inert gases, CO gas and hydrogen gas to form baked product and then the baked product is pulverized.

7. The method according to claim 1, wherein the thus formed SiC sintered molding is heated at a temperature of 600°–1,700° C. under an oxidizing atmosphere to remove free carbon contained in the SiC sintered molding.

8. A method for producing SiC sintered moldings, which comprises mixing SiC fibers obtained by spinning organosilicon high molecular weight compounds into filaments and then baking the formed filaments under an atmosphere selected from a vacuum, inert gases, CO gas or hydrogen gas, with 0.3–30% by weight of a binder consisting essentially of organosilicon high molecular weight compounds having silicon and carbon as the main skeleton components, which have been produced by polycondensation of polysilane compounds having Si—Si bond, molding the resulting mixture into a desired shape and heating the molding at a temperature of not higher than 2,200° C. under a non-oxidizing atmosphere to form SiC sintered molding.

9. The method according to claim 8, wherein the spun filaments have a diameter of 5–100μ.

10. The method according to claim 8, wherein the spun filaments were heated at a temperature lower than 300° C. in air to form an oxidized layer on the filament surface.

11. The method according to claim 10, wherein the spun filaments having the oxidized layer are preliminarily heated at a temperature of 350°–800° C. under vacuum to volatilize low molecular weight compounds contained in the spun filaments.

12. The method according to claim 8, wherein said polysilane compounds are polydimethylsilanes.

13. The method according to claim 8, wherein the thus formed SiC sintered molding is heated at a temperature of 600°–1,700° C. under an oxidizing atmosphere to remove free carbon contained in SiC sintered molding.

14. The method according to claim 8, wherein the mixture of SiC fibers and the binder is press molded by a hot press process, during which sintering is effected.

15. The method according to claim 8, wherein the sintering step of SiC fibers is effected under pressure of a non-oxidizing atmosphere of inert gases, CO gas or hydrogen gas.

* * * * *